United States Patent [19]

Holland

[11] 3,990,718
[45] Nov. 9, 1976

[54] TWIN PULL UNIT FOR AGRICULTURAL IMPLEMENTS

[76] Inventor: Colin John Holland, 73 Henry St., Cannington, Australia

[22] Filed: May 12, 1975

[21] Appl. No.: 576,920

[52] U.S. Cl. .......................... 280/408; 280/411 R; 280/412
[51] Int. Cl.² .......................................... B60D 1/00
[58] Field of Search ........ 280/408, 412, 462, 476 R, 280/411 R, 413, 472, 476 A; 172/201, 313, 314, 654, 669, 667

[56] References Cited
UNITED STATES PATENTS

| | | | |
|---|---|---|---|
| 3,038,741 | 6/1962 | Dorsch | 280/412 |
| 3,112,124 | 11/1963 | Bartel | 280/412 |
| 3,292,948 | 12/1966 | McMasters et al. | 280/412 |
| 3,334,916 | 8/1967 | Tibbals | 280/412 |

*Primary Examiner*—Kenneth H. Betts
*Assistant Examiner*—R. Schrecengost
*Attorney, Agent, or Firm*—William A. Drucker

[57] ABSTRACT

The invention is concerned with a twin tow unit which enables a single tractor to pull two agricultural implements simultaneously. The unit comprises a substantially elongated inverted U-shaped main member, the forward end of which is supported on at least one castor mounted land wheel and the rear end of which is supported on at least one land wheel. Means are provided for locking the rear land wheel in position and links are provided for coupling the front and rear end of the unit to a tractor and each end of the unit is provided with hitching means to which the tow bar of an agricultural unit may be attached.

2 Claims, 10 Drawing Figures

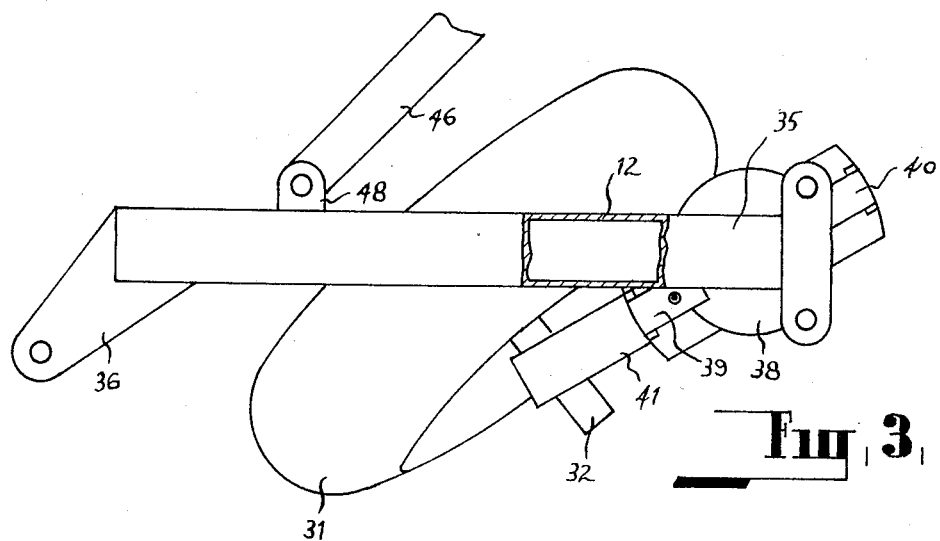
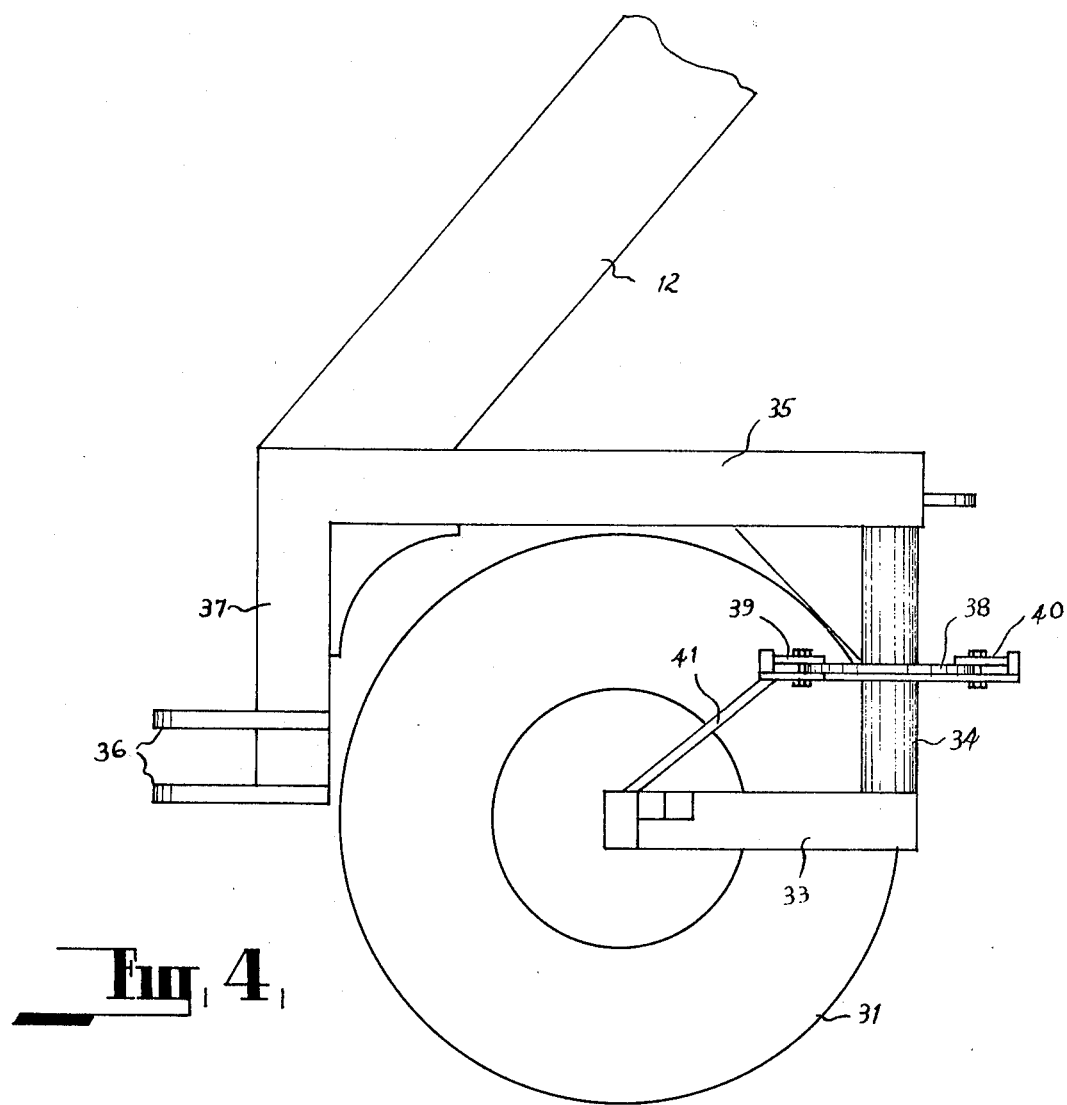

TWIN PULL UNIT FOR AGRICULTURAL IMPLEMENTS

This invention relates to an improved twin tow unit which will enable a single tractor to pull two agricultural implements simultaneously.

The object of the invention is to provide a twin tow unit which is relatively simple and economical in construction and which will maintain the two implements being towed in the correct relative positions with a minimum of action on the part of the tractor operator and which can be readily converted to a line ahead towing position without unhitching the implements from the unit.

In one form the invention resides in a twin tow unit comprising a substantially elongated inverted U-shaped main member, the forward end of which is supported on at least one castor mounted land wheel and the rear end of which is supported on at least one land wheel, means for locking the rear land wheel in the desired direction of travel, means for hitching implements to the unit adjacent the front and rear land wheels, the first tow bar extending forwardly from the forward end of the unit and a second tow bar extending forwardly from the rear end of the unit to the forward portion of the tow bar.

Preferably the length of the main member is adjustable. It is also preferable that the rear end of the unit be supported on two land wheels for stability.

The invention will be better understood by reference to the following description of the specific embodiments thereof shown in the accompanying drawings wherein:

FIG. 3 is a plan view of another form of the rear land wheel assembly;

FIG. 4 is a side elevation of the rear land wheel assembly of FIG. 3;

Figure 5:
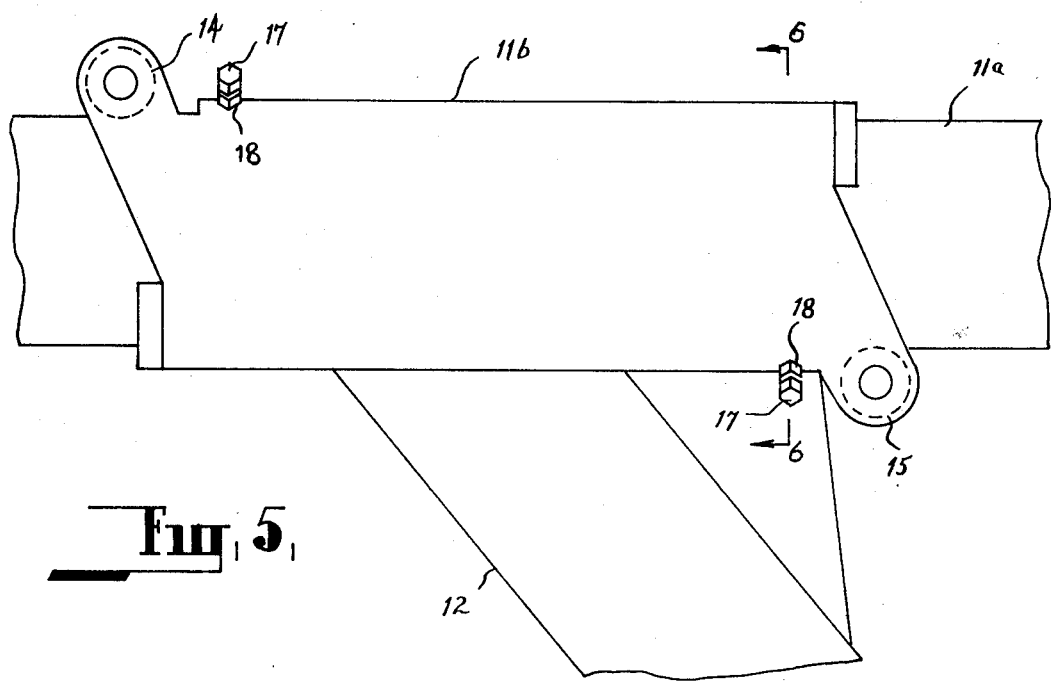
FIG. 5 is a fragmentary side elevation showing two sections of the main member slidably coupled together to enable the length of the main member to be varied.
Figure 6:
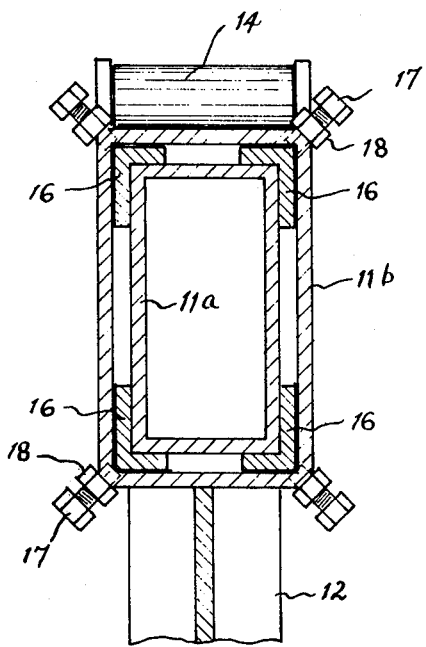
FIG. 6 is a section on line 6—6 of FIG. 5.

As shown in the drawings the main member is formed of heavy gauge box section metal and is substantially inverted U-shaped in side elevation having an elevated horizontal member or main beam 11 and downwardly and outwardly projecting vertical arms 12 and 13. Preferably the main beam is divided into two sections so that the length thereof can be increased or decreased as required. As shown in FIGS. 5 and 6 of the drawings one section 11a of the main beam is slidably positioned within a short section 11b of the horizontal member. The outer section 11b is provided with transverse rollers 14 and 15 positioned in diametrically opposed positions one bearing against the upper surface of the section 11a and the other bearing against the lower surface of the section 11a to ensure that the two sections remain correctly aligned and to reduce the possibility of binding during adjustment. Clamping members 16 are fitted around each corner of the inner section 11a and are actuated by set screws 17 passing through threaded opening in the outer section 11b. A lock nut 18 is provided on each set screw. The outer section 11b is fixed to the upper end of the rear vertical arm 12 of the main member. If desired the upper end of the forward vertical arm 13 may be bolted to the forward end of the section 11a by means of flanges 19 and 20 as shown in FIGS. 7 and 8 of the drawings.

Figure 1:
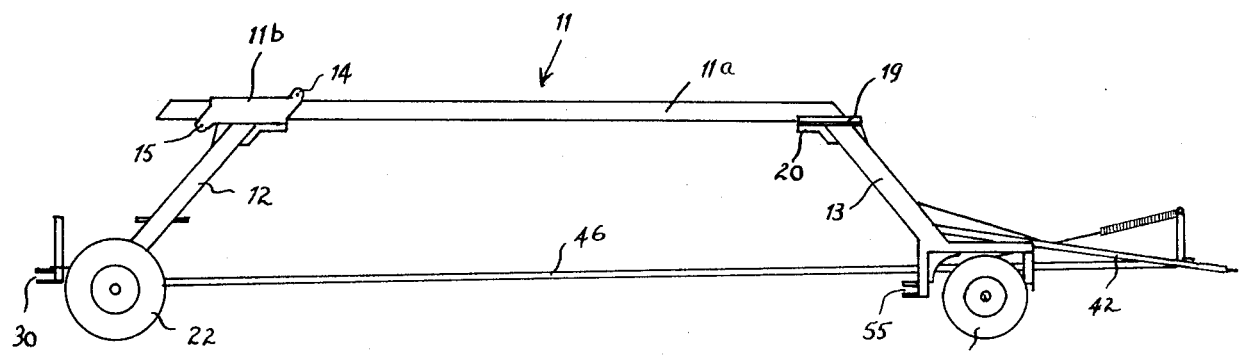
FIG. 1 is a side elevation of the unit in the line ahead towing position.
Figure 2:
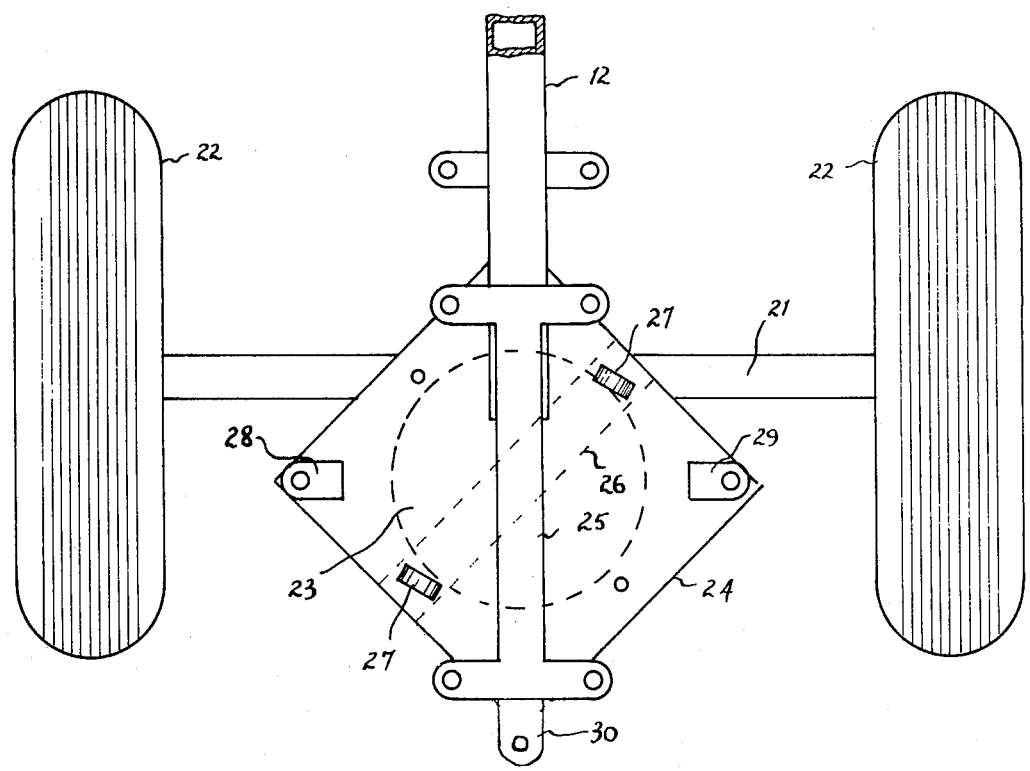
FIG. 2 is a plan view of a preferred form of the rear end of the unit.

As shown in FIG. 2 of the drawings the rear wheel assembly comprises a transverse axle 21 fitted with pneumatically tyred land wheels 22, the axle being fixed to a turntable 23 which is rotatably mounted on a plate 24 fixed to the lower end of the rear vertical arm 12. The rear end of the plate is supported by a brace 25. The turntable is clamped in the desired position by means of a bar 26 clamped in place by means of bolts 27 passing through the plate 24. The plate is provided with hitches 28 and 29 to one of which a tow bar may be attached when the unit is in the operative position and a hitch 30 to which an agricultural implement may be attached.

In an alternative form of rear wheel assembly shown in FIGS. 3 and 4 a single pneumatic tyred land wheel 31 is mounted on a stub axle 32, carried by a rearwardly projecting arm 33 rotatably mounted on the lower end of a vertical shaft 34 the upper end of which is supported by an arm 35 projecting forwardly from the lower end of the rear vertical arm 12 of the main frame. A hitch 36 is fitted to the lower end of an arm 37 projecting downwardly from the lower end of the rear vertical arm 12. The shaft 34 is provided with a disc 38 the periphery of which is engaged by clamping members 39 and 40 carried by a bracket 41 projecting upwardly and forwardly from the arm 33. The clamping members 39 and 40 hold the wheel 31 in the desired tracking position. The wheel 31 is cambered to prevent the unit from tipping over.

Figure 7:
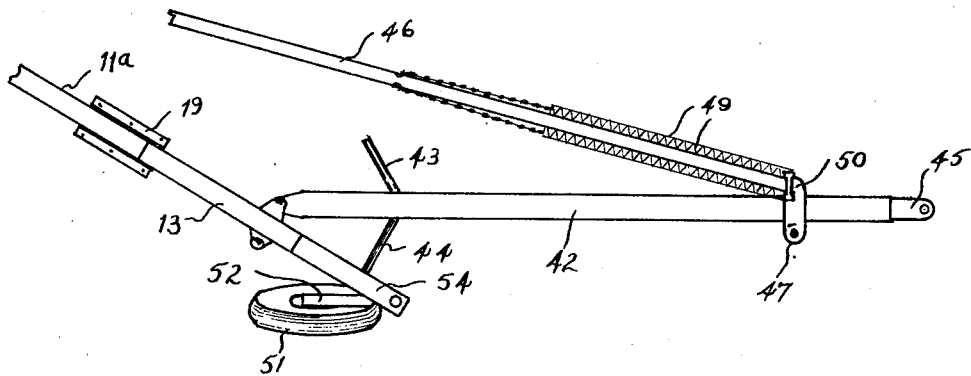
FIG. 7 is a plan view of the forward end of the unit.
Figure 8:
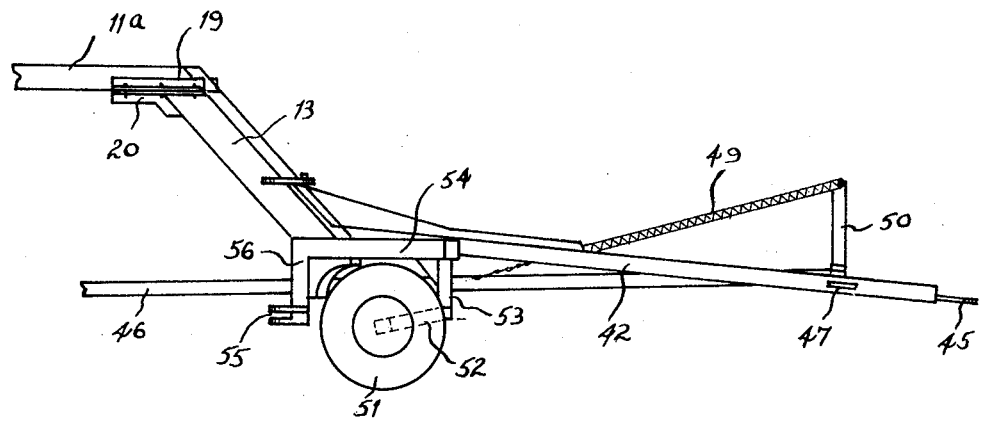
FIG. 8 is a side elevation corresponding to FIG. 7.
Figure 9:
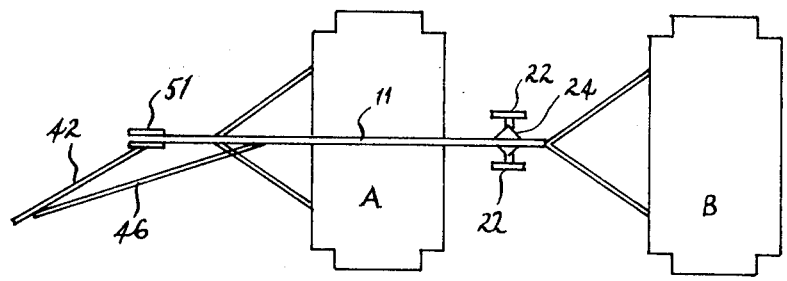
FIG. 9 is a diagrammatic plan view of the unit in the line ahead towing position.

Turning now to FIGS. 7 and 8 the forward end of the unit is provided with a first tow bar 42 which is pivotally mounted on the forward vertical arm 13 for rotation about a vertical axis. Stops 43 and 44 are provided for limiting the movement of the tow bar which is provided at its forward end with means 45 for hitching it to a towing vehicle such as a tractor. The forward end of a second tow bar 46 is pivotally mounted on a bracket 47 fixed near the forward end of the first tow bar 42. The rear end of the second tow bar 46 is adapted to be coupled to one of the hitches 28 or 29 shown in FIG. 2 or the hitch 48 shown in FIG. 3 and to a bracket on the section 11a (as shown in FIG. 9) when in the line ahead position. The weight of the second tow bar 46 is counterbalanced by coil springs 49 fitted between the tow bar and a post 50 projecting upwardly from the bracket 47. The forward land wheel assembly comprises a pneumatically tyred wheel 51 mounted on a stub axle carried by a rearwardly projecting arm 52 pivotally mounted on the lower end of a shaft 53 depending downwardly from the forward end of a forwardly projecting arm 54 fixed to the lower end of the forward vertical arm 13. A hitch 55 to which an agricultural implement may be attached is fixed to the lower end of an arm 56 projecting downwardly from the lower end of the forward vertical arm 13.

Figure 10:
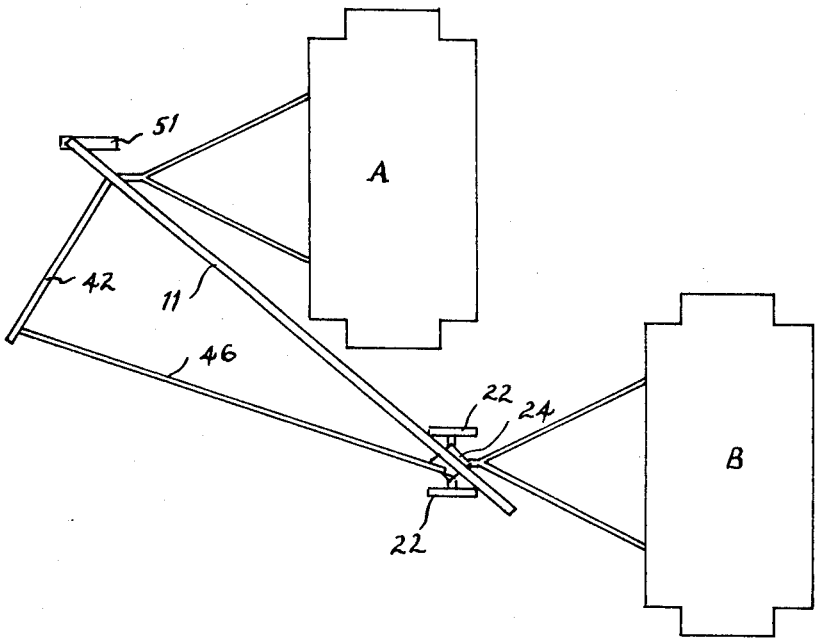
FIG. 10 is a diagrammatic plan view of the unit in the working position.

The operation of the unit will now be explained with reference to FIGS. 9 and 10. In the line ahead position as shown in FIG. 9 the rear end of the tow bar 46 is connected to the section 11a of the main member and the tow bar 42 to the tractor. The implements A and B assume a position one behind the other. The operative position is shown in FIG. 10 with the implements A in front of and to one side of implement B.

The adjustable length of the main member enables the unit to be adjusted for any width of agricultural implement and the two implements may be of the same width or different widths. The unit permits the implements to be transported from one position to another in the line ahead position without uncoupling.

I claim:

1. A twin tow unit comprising a substantially inverted U-shaped main member, the forward end of which is supported on at least one castor mounted land wheel and the rear end of which is supported on at least one land wheel, means for locking the rear wheel in the desired direction of travel, means for hitching implements to the unit adjacent the front and rear land wheels, a first tow bar extending forwardly from the forward end of the unit and a second tow bar from the rear end of the unit to the forward portion of the first tow bar, the horizontal portion of the main member being divided into two sections, the first section being slidably positioned with the second section which is fixed to the upper end of the rear vertical portion of the main member, said second section being provided with diametrally opposed transverse rollers one bearing against the upper surface of the first section and the other bearing against the undersurface of the first section and with clamping means adapted to engage said first section.

2. A twin tow unit comprising a substantially inverted U-shaped main member, the forward end of which is supported on at least one castor mounted land wheel, and the rear end of which is supported on at least one land wheel, means for locking the rear wheel in the desired direction of travel, means for hitching implements to the unit adjacent the front and rear land wheels, a first tow bar extending forwardly from the forward end of the unit and a second tow bar from the rear end of the unit to the forward portion of the first tow bar, the forward end of the second tow bar being connected to a bracket on the forward portion of the first tow bar and the weight of the second tow bar being counter-balanced by means of at least one coil spring positioned between and positioned intermediate the end of the second tow bar and the upper end of a post projecting upwardly from the first tow bar adjacent the position of attachment of the second tow bar to the first tow bar.

* * * * *